Jan. 2, 1968  D. SIMKINS  3,361,309
DISPOSABLE CONTAINER FOR DISPENSING LIQUIDS
Filed April 1, 1966  2 Sheets-Sheet 1
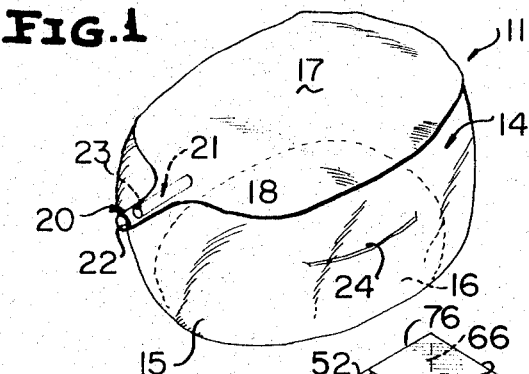
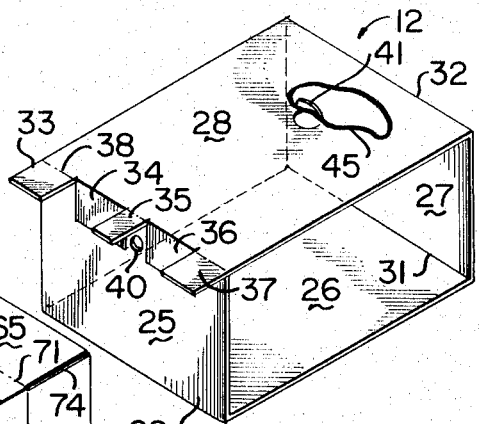
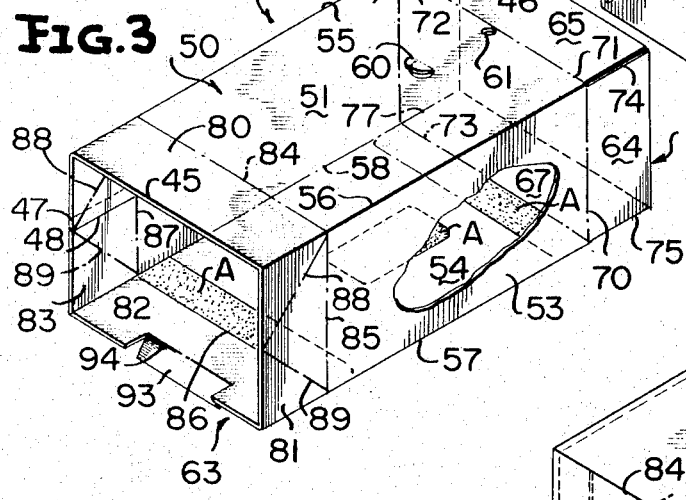
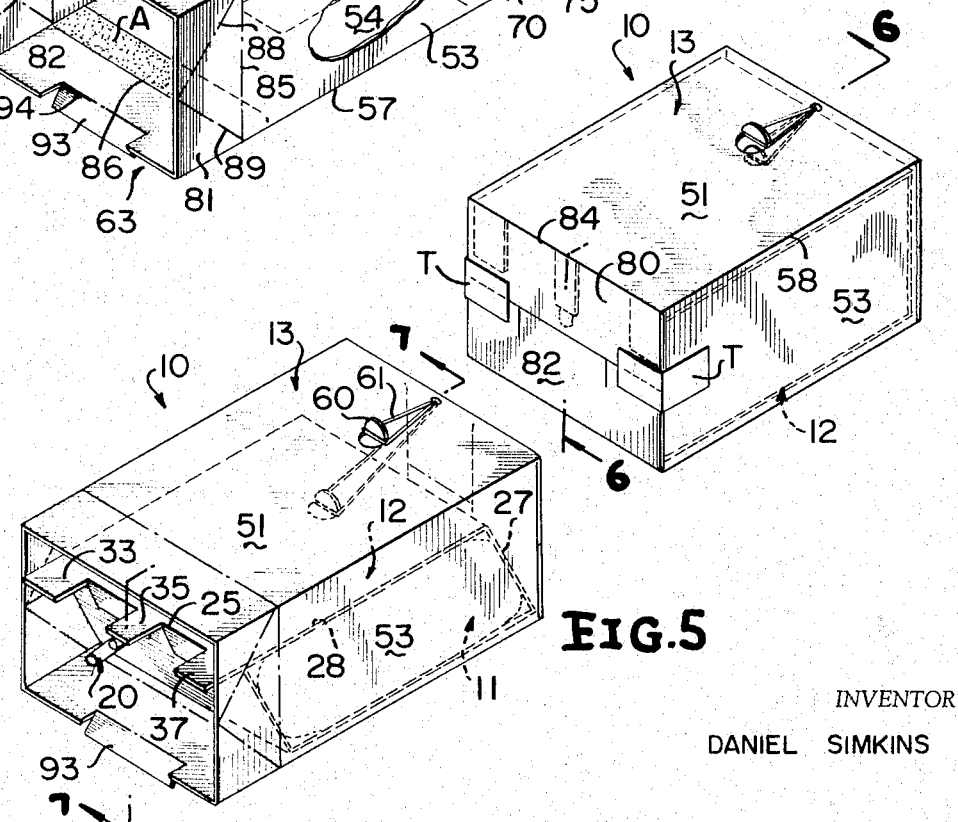
INVENTOR
DANIEL SIMKINS
BY
Mason, Porter, Diller & Brown
ATTORNEYS

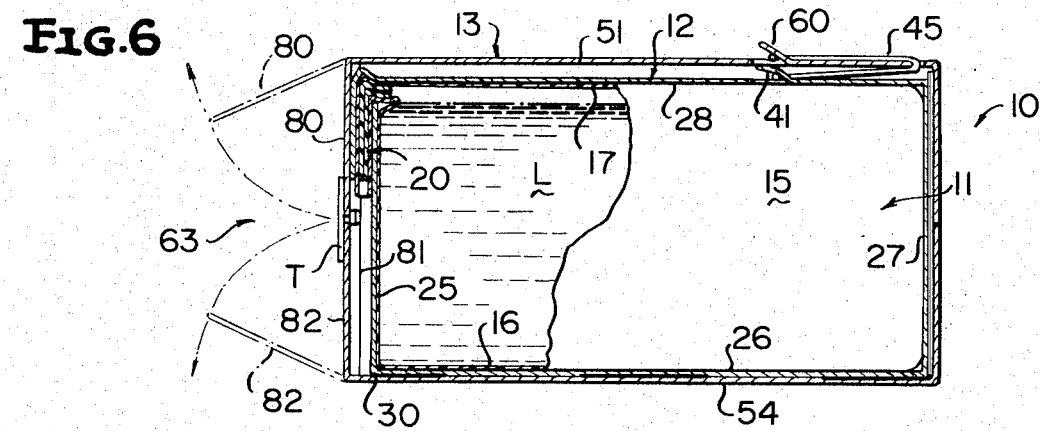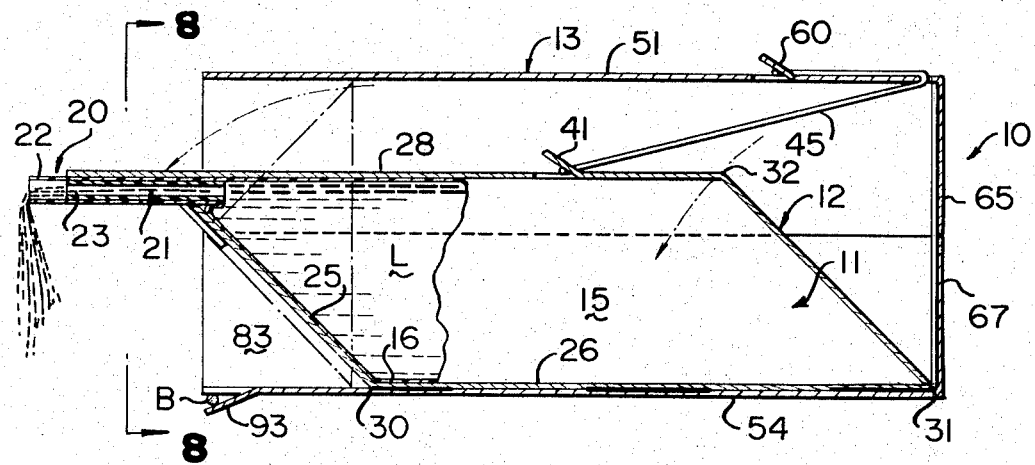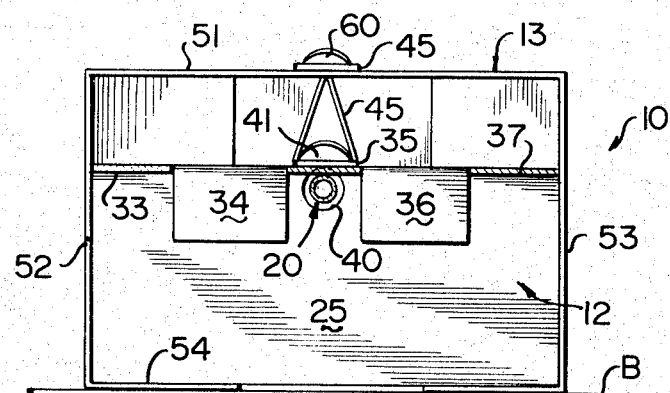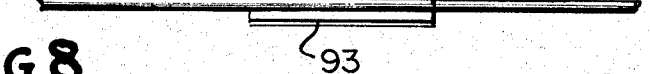

United States Patent Office 3,361,309
Patented Jan. 2, 1968

3,361,309
DISPOSABLE CONTAINER FOR DISPENSING
LIQUIDS
Daniel Simkins, Chicago, Ill., assignor to Continental Can Company, Inc., New York, N.Y., a corporation of New York
Filed Apr. 1, 1966, Ser. No. 539,524
14 Claims. (Cl. 222—533)

ABSTRACT OF THE DISCLOSURE

This invention relates to a disposable container for dispensing liquids, and includes an inner container body, a sleeve and an outer closure. The inner container body is a bag having a pour spout at an upper portion thereof which is connected to an upstanding panel of the sleeve. The panel is in turn joined to a base along a fold line and upon the swinging movement of the panel toward the base the spout is lowered to shorten the effective height of the bag and thereby gravity dispense an upper strata of a product packaged in the bag.

---

While dispensing containers for edible liquids are common in the field of commercial food distribution, such as restaurants, little has been done in the past to provide a suitable, inexpensive, disposable liquid dispensing container for household use. For example, while it is becoming exceedingly more common to dispense milk from a stationary dispensing container into a glass in restaurants, conventional milk bottles, cartons or similar home-size containers are completely devoid of dispensing means and must generally be manually grasped, lifted and tipped to pour contents therefrom. A major factor for this shortcoming has been the difficulty of others to develop a dispensing container which could be manufactured sufficiently inexpensively to permit the disposal thereof when empty.

Typical of commercial dispensers are fifty-gallon metallic tanks which are emptied through an orifice at their base and, consequently, are equipped with a shut-off valve. Such valves represent increased manufacturing costs as do ancillary components of such tanks, such as separate closures for closing fill openings, separate seals, etc. Dispensing containers of this nature are, therefore, restricted to the commercial field due to their high manufacturing costs, nondisposable nature, excessive size and excessive weight.

In keeping with the above, it is a primary object of this invention to provide a low cost, low weight disposable liquid dispensing container devoid of any type of valves or other moving parts whereby the above and numerous other disadvantages inherent in prior art containers are either entirely eliminated or minimized.

A further object of this invention is to provide a novel dispensing container which includes a container body having a bottom wall and a relatively rigid normally upstanding wall hingedly connected to the bottom wall, and the container body including dispensing means at an upper end portion thereof whereby upon the hinging movement of the upstanding wall toward the bottom wall, liquid in the container is drained off and dispensed by said dispensing means, and the dispensing is automatically terminated upon the return movement of the upstanding wall to the normal upstanding position thereof.

A further object of this invention is to provide a novel dispensing container of the type above described in which the container body is a bag-like structure, the bag-like structure is at least partially encapsulated by a sleeve-like member, and the sleeve-like member is defined in part by the upstanding and bottom walls.

A further object of this invention is to provide a novel dispensing container of the type heretofore described and including additional encapsulating means for encapsulating both the sleeve-like member and the bag-like member, the additional encapsulating means being an additional container body, and the additional container body including means for securing the dispensing container to a supporting surface and preventing bodily movement of the dispensing container during a dispensing operation.

A further object of this invention is to provide a novel dispensing container for liquids of the type heretofore described, the dispensing container including means for automatically returning the upstanding panel away from the bottom panel at the termination of a dispensing operation to discontinue the flow of liquids from the bag-like structure through the dispensing means.

With the above and other objects in view that will hereinafter appear, the nature of the invention will be more clearly understood by reference to the following detailed description, the appended claimed subject matter, and the several views illustrated in the accompanying drawings.

In the drawings:

FIGURE 1 is a top perspective view of a bag-like structure forming one component of the dispensing container of this invention, and illustrates a pour spout at an upper portion of the bag-like structure.

FIGURE 2 is a top perspective view of a sleeve-like member forming another component of the dispensing container, and illustrates the normal non-dispensing configuration thereof.

FIGURE 3 is a top perspective view of an overwrap forming a final component of the dispensing container, and illustrates adhesive means for bonding the sleeve-like member to a bottom wall of the overwrap.

FIGURE 4 is a top perspective view of the dispensing container, and illustrates the components of FIGURES 1 and 2 completely housed in the overwrap of FIGURE 3.

FIGURE 5 is a top perspective view of the dispensing container of FIGURE 4 after a portion of the overwrap has been opened, and illustrates in phantom outline a dispensnig position of the container.

FIGURE 6 is an enlarged sectional view taken generally along line 6—6 of FIGURE 4, and more clearly illustrates the various components of the container prior to performing a dispensing operation.

FIGURE 7 is an enlarged sectional view taken generally along line 7—7 of FIGURE 5, and more clearly illustrates the dispensing position of the container.

FIGURE 8 is a front view of the dispensing container taken generally along line 8—8 of FIGURE 7, and illustrates the pour spout of the bag-like structure projecting through an opening in an upstanding panel of the sleeve-like member.

A novel dispensing container for liquids constructed in accordance with this invention is fully illustrated in FIGURES 4–8 of the drawings, and is generally referred to by the reference numeral 10. The dispensing container 10 includes a bag-like structure 11 (FIGURE 1), a sleeve-like structure 12 (FIGURE 2) and an overwrap 13 (FIGURE 3).

The bag-like structure or bag 11 of FIGURE 1 includes a bag or container body 14 defined by a peripheral wall 15, a bottom wall 16 and a top wall 17. The walls 15 and 17 merge at an upper portion 18 of the body 14 to define dispensing means in the form of a pour spout 20. The bag 11 is preferably constructed from transparent polymeric material, such as polyethylene, and is relatively resilient and non-self-supporting. A rigid tubular element 21 is frictionally or adhesively secured within a major portion of the pour spout 20 and functions to rigidify the spout 20, as is readily apparent from FIGURE 1 of the drawings. An end portion 22 of the pour spout 20 projects beyond an end portion 23 of the tubular element 21, as is best illustrated in FIGURE 7 of the drawings.

The peripheral wall 15 of the bag body 14 is provided with a seal 24. Prior to the formation of the seal 24, this same portion of the wall 15 is provided with an aperture (not shown) through which a suitable liquid product, such as milk, is packaged into the bag 11 after the pour spout 20 is closed by suitable means (not shown). The seal 24 is illustrated as a heat seal, but it is to be understood that the opening (not shown) originally formed in the wall 15 can be closed by any other type of conventional means as, for example, by merely gathering the material adjoining and defining the opening and binding or clamping the same together. The particular manner by which the container 11 is filled with a suitable dispensable product will be described more fully hereafter.

The sleeve-like member or sleeve 12 of the dispensing container 10 is preferably constructed from a generally rectangular blank of paperstock material or paperboard, such as relatively heavy gauge boxboard or corrugated board. The sleeve 12 includes an upstanding front panel 25, a bottom panel 26, an upstanding rear panel 27 and a top panel 28. The panels 25–28 are joined to one another by respective fold lines 30–32. A plurality of generally rectangular projections or tabs 33–37 are joined to the top panel 28 along a fold line 38. The tabs 34 and 36 are bent along the fold line 38 into contact with the upstanding front panel 25 and are secured thereto by adhesive (not shown). A generally circular opening 40 (FIGURE 8) is formed in the panel 25 of the sleeve 12 while a tab 41 is struck from a material of the top panel 25 and directed upwardly and outwardly thereof. An elastic or rubber band 45 is shown loosely engaging the tab 41 in FIGURE 2 of the drawings for a purpose which will be more apparent hereafter. It is also to be noted that while the sleeve 12 is constructed of relatively rigid material, the same is hingeable or foldable from the position illustrated in FIGURE 2 to a generally flat position by folding along the fold lines 30–32 and 38. The fold lines thereby define hinge means of the sleeve 12.

The overwrap 13 (FIGURE 3) is formed from a relatively flexible blank of rectangular sheet material having longitudinal edges 45, 46 and overlapped transverse edges 47, 48. The blank (not shown) is formed into a generally rectangular body 50 having a top panel 51, a pair of side panels 52, 53 and a bottom panel 54. The panels 51, 52, 54 and 53 are hingedly joined to one another by respective fold lines 55, 56, 57 and 58. A tab 60 is struck from the top panel 51 and an aperture 61 is similarly formed therein. The purpose of the tab 60 and aperture 61 will be more apparent hereafter. Adhesive A is applied to the bottom panel 54 of the overwrap 13, as is clearly illustrated by the stippling in FIGURE 3 of the drawings.

The overwrap 13 includes opposite axial end portions 62, 63 which are foldable to close the dispening container 10 as will be more apparent hereafter.

The end portion 62 of the overwrap 13 includes a plurality of flaps 64, 65, 66 and 67 joined to the respective panels 53, 51, 50 and 54 along respective fold lines 70, 71, 72 and 73. Adjacent ones of the flaps 64–67 are separated by severance lines 74–77.

The end portion 63 of the overwrap 13 forms the front end portion of the dispensing container 10 and similarly includes a plurality of flaps 80, 81, 82 and 83 joined to the respective panels 51, 53, 54 and 52 along respective fold lines 84, 85, 86 and 87. Diagonal fold lines 88, 89 are formed in each of the flaps 83, 81 to facilitate the folding thereof, as will be more apparent hereafter. A flap 93 foldable along a fold line 94 is formed in the flap 82 and defines means for maintaining the dispensing container 10 stationary during a dispensing operation as will be more apparent immediately hereafter.

The components 11–13 are assembled to form the dispensing container of FIGURE 4 in any one of several different ways. For example, assuming that the bag 11 is filled with a dispensable liquid, sealed at 24, and the pour spout 20 thereof is closed, the bag 11 is inserted into the sleeve 12 with the walls 17, 28 and 15, 26 adjacent each other. The pour spout 20 is inserted through the circular opening 40 and projects outwardly beneath the projecting tab 35, as is best illustrated in FIGURE 7 of the drawings.

The sleeve 12 can then be either slid into the overwrap 13 through either of the opposite end portions 62, 63 or while the overwrap 13 is in its planar form, the combined bag 11 and sleeve 12 can be placed upon the panel 54 and thereafter wrapped about the bag and sleeve 11, 12 respectively. The elastic band 45 is passed through the aperture 61 and looped about the tab 60 after which the opposite end portions 62, 63 are closed. The end portion 62 is closed by enfolding the flaps 64, 66 and thereafter overfolding the flaps 65, 67. Suitable adhesive means maintains the flaps 64–67 in closed relationship. The front end portion 63 of the overwrap 13 is closed by folding the flaps 81, 83 about the respective fold lines 88, 89 in such a manner that the generally triangular portion of these flaps defined by the fold lines 88, 89 are directed toward each other (not shown). Thereafter, the flap 82 and the flap 80 are folded about the respective fold lines 86, 84 and sealed in position by tape or similar conventional securing means T (FIGURE 4).

Another manner of uniting the components 11–13 which is preferred over that already described is as follows:

Assuming the bag 11 is not filled, the opening (not shown) closed by the seal 24 is still open and the overwrap 13 is in flat planar form, the sleeve 12 is positioned on edge upon the panel 53 with the fold line 30 rising upwardly from the point of intersection of the fold lines 57, 85, the fold 38 rising upwardly from the intersection of the fold lines 58, 85, the fold line 32 rising upwardly from the intersection of the fold lines 58, 70, and the fold line 31 rising upwardly from the intersection of the fold lines 70, 57. The empty bag 11 is then inserted through the open upper end (unnumbered) of the sleeve 12 with the fill opening (unnumbered) of the bag 11 uppermost. The pour spout 20 may be closed before or after being inserted through the U-shaped opening 40 in the front panel 25 of the sleeve 12, after which suitable liquid L (FIGURES 6 and 7) is inserted into the interior of the bag 11 through the fill opening. Thereafter the opening is closed by the seal 24 and the overwrap 13 is wrapped about the sleeve 12 to bring the edges 47, 48 thereof into overlapped relationship. As the overwrap 13 is wrapped about the sleeve 12, the rubber or adhesive band 45 is passed through the opening 61 of the overwrap 13 and looped about the tab 60. During this overwrapping, the adhesive A on the panel 54 is brought into contact with the underside (unnumbered) of the panel 26 and similar adhesive (not shown) between the overlapped transverse edge portions 47, 48 maintains the same in adhesive contact. Thereafter, the opposite end portions 62, 63 are sealed closed in the manner heretofore described to complete the formation of the dispensing container 10, as illustrated in FIGURE 4 of the drawings.

It is to be noted that during the assembly of the components 11–13 and particularly during the closing of the end portion 63, the projections 33, 35 and 36 and the pour spout 20 are folded into generally parallel relationship to the front panel 25 (FIGURE 6). While the tubular element 21 is substantially rigid, it is also sufficiently pliable or bendable to permit this folding in the manner best illustrated in FIGURE 6 whereby the dispensing container 10 is provided with a generally uniform polygonal configuration.

In a dispensing operation the dispensing of the liquid L from the dispensing container 10 is performed by first removing the pieces of tape T (FIGURE 4) and opening the front end portion 63 of the overwrap 13 in the manner indicated by the unnumbered headed arrows in phantom outline illustration in FIGURE 6 of the drawings until the front end portion is completely opened, as illustrated in solid lines in FIGURES 5, 7 and 8 of the drawings. During the opening of the front end portion 63, the natural resiliency of the material from which the sleeve 12 and the bag 11 are constructed permits the tabs 33, 35 and 37 and the pour spout 20 to rebound from the position illustrated in FIGURE 6 to the position shown in FIGURE 7. If the dispensing container is supported by a conventional refrigerator rack (not shown), the tab 93 is folded downwardly about the fold line 94 and directed beneath one supporting bar or rod B (FIGURE 7) of the refrigerator rack to prevent the movement of the dispensing container from right-to-left as viewed in FIGURE 7 of the drawings, as will be more apparent hereafter.

The pour spout 20 is then opened by, for example, removing a stopper (not shown) from the end portion 22 and a glass or similar receptacle is held beneath the pour spout. At this time the upper level of the liquid L is beneath the opening (unnumbered) in the element 21 and the pour spout 20 and dispensing does not occur. However, upon grasping any one of the tabs 33, 35 and 37 and pulling the tabs outwardly to the end portion 63, the sleeve 12 hinges about the various fold lines 30, 31, 32 and 38 which reduces the axial distance between the pour spout 20 and the bottom wall 26 and brings the pour spout 20 to and beneath the upper level of the liquid L whereupon the same passes through the tubular element 21, outwardly through the pour spout 20 and into the glass or similar receptacle. The same outward drawing or pulling of the tabs which transforms the generally rectangular cross-sectional configuration of the sleeve 12 (FIGURE 6) to the generally rhomboidal cross-sectional configuration (FIGURE 7) also stretches and tensions the elastic band 45 as is clearly illustrated in FIGURE 7 of the drawings. At the completion of the dispensing operation and upon the release of any of the tabs 33, 35 or 37, the elastic band 45 automatically draws the sleeve 12 back to the original rectangular cross-sectinoal configuration thereof and stops the dispensing operation by bringing the pour spout above the upper level of the liquid L.

Since the pour spout 20 is maintained above the upper level of the liquid L by the force of the band 45, it is unnecessary to close the pour spout 20 but, if desired, the stopper (not shown) or similar means may be provided for closing the end portion 22 of the pour spout 20. Furthermore, it should also be noted that the tabs 41, 60, the aperture 61 and the band 45 can be eliminated and the dispensing container 10 is equally operative but does not include the automatic return to the non-dispensing position. In this latter case the sleeve 12 will necessarily be drawn outwardly to the dispensing position (FIGURE 7) and pushed manually inwardly to the non-dispensing position after which an end portion 63 is preferably closed to prevent the accidental collapsing of the sleeve to the dispensing position.

While the dispensing container 10 is preferably of a three-part construction, it is also considered within the scope of this invention to, in cases where necessary or desirable, eliminate the overwrap 13. Furthermore, it is also possible to form a dispensing container in accordance with this invention by, for example, closing the axial openings of the sleeve 12 by panels formed from elastic material, forming an integral pour spout from the material of the front panel 25 instead of forming the opening 40, and eliminating the struck tab 41. A dispensing container so constructed would be of essentially a one-piece construction and would not, of course, require the separate encapsulation of the container 11 by the sleeve 12 and the subsequent encapsulation of both the container 11 and sleeve 12 by the overwrap 13.

It is also within the scope of the invention to change the bag 11 with a dispensable product by first forming the seal 24 or, alternatively, constructing the bag 11 with no other opening than the opening defined by the pour spout 20. The components 11, 12, 13 are then assembled in the manner heretofore described and the overwrap 13 is closed, as shown in FIGURE 4. The dispensing container 10 of FIGURE 4 (but unfilled) is then shipped to a packager who fills the bag 11 directly through the pour spout 20, reseals the container 10, and stores and/or ships the same to purchasers.

While preferred forms and arrangement of parts have been shown in illustrating the invention, it is to be clearly understood that various changes in details and arrangements of parts may be made without departing from the spirit and scope of the invention as defined in the appended claimed subject matter.

I claim:

1. A dispensing container for dispensing an upper strata of a flowable product by reducing the volume of the container upon shortening a normal non-dispensing linear dimension of the container measured between dispensing means at a top of the container and its bottom upon swinging movement of the dispensing means toward the bottom to a dispensing position, said dispensing container comprising a container body having top and bottom portions, means for gravity dispensing only an upper strata of a flowable product adapted to be housed in said body, said dispensing means being carried by said body and normally spaced a predetermined linear dimension from said bottom portion in a non-dispensing position of said container, and means for swinging said body and said dispensing means from the non-dispensing position toward said bottom portion thereby shortening said predetermined distance, and disposing said dispensing means at the upper stratum of the flowable product thereby effecting the gravity dispensing of only the upper strata of the product therefrom.

2. The dispensing container as defined in claim including a rigid outer container having walls defining an enclosure and including a base and an openable end, said container body being disposed in said enclosure and supported from said base, said container body having an end wall opposing said openable end, said swinging means also providing means for reinforcing said end wall for limiting the movement of said end wall to a swinging movement through said openable end, and said dispensing means includes a dispensing spout projecting from said end wall remote from said base and being progressively movable toward said base in response to the swinging of said end wall to provide for gravity dispensing for all levels of a product within said container body.

3. The dispensing container as defined in claim 1 including a rigid outer container having walls defining an enclosure and including a base and an openable end, an intermediate container within said outer container and seated on said base, said intermediate container having walls defining an enclosure with open sides whereby said walls are freely hinged relative to one another and an end wall of said intermediate container is free to swing through said outer container openable end in the absence of the collapsing of said rigid outer container while a base of said intermediate container remains seated on said outer container base, said container body being disposed within said intermediate container, said dispensing means including a dispensing spout supported by said intermediate container end wall for movement to said dispensing position through said outer container openable end and being progressively movable toward said outer container base in response to the swinging of said intermediate container end wall to provide gravity dispensing for all levels of a flowable product within said container body.

4. The dispensing container as defined in claim 1 including means for automatically returning said dispensing means from said non-dispensing position to said dispensing position at the termination of a dispensing operation.

5. The dispensing container as defined in claim 1 wherein said container body includes a generally upstanding panel disposed between said top and bottom portions, said dispensing means being operatively coupled to said panel, said swinging means being hinge means joining said upstanding panel to said body, and said hinge means providing for the hinging movement of said panel toward said bottom portion during a dispensing operation.

6. The dispensing container as defined in claim 5 wherein said container body and said swinging means are separate and distinct components of said container.

7. The dispensing container as defined in claim 5 including means for at least partially encapsulating said container body, and said swinging means forms a portion of said encapsulating means.

8. The dispensing container as defined in claim 5 wherein said hinge means is a fold line joining said upstanding panel to said bottom portion, and said upstanding panel is of otherwise relatively non-foldable construction.

9. The dispensing container as defined in claim 5 including means for securing said container to a supporting surface and preventing bodily movement of said container during a dispensing operation.

10. The dispensing container as defined in claim 5 wherein said container body includes means for facilitating the manual gripping of said body for effecting the hinging movement of said upstanding panel during a dispensing operation.

11. The dispensing container as defined in claim 5 including means for automatically returning said upstanding portion away from said bottom panel at the termination of a dispensing operation.

12. The dispensing container as defined in claim 1 including a sleeve-like member at least partially encapsulating said container body, and said swinging means being a normally upstanding hingeable panel of said sleeve-like member.

13. The dispensing container as defined in claim 1 wherein said container body is a bag-like structure, said dispensing means defines a pour spout opening into the bag-like structure at said top portion, means at least partially encapsulating said structure, and said swinging means forms a portion of said encapsulating means.

14. The dispensing container as defined in claim 1 including means for securing said container to a supporting surface and preventing bodily movement of said container during a dispensing operation.

References Cited

UNITED STATES PATENTS

| | | | |
|---|---|---|---|
| 2,574,931 | 11/1951 | Nason | 222—105 |
| 3,189,228 | 6/1965 | Steinbart | 222—215 X |
| 3,191,810 | 6/1965 | Johnston | 222—183 |
| 3,217,933 | 11/1965 | Watson | 222—105 X |
| 3,220,609 | 11/1965 | Russell et al. | 222—206 |
| 3,221,943 | 12/1965 | Anderson | 222—183 |
| 3,233,817 | 2/1966 | Casady | 229—14 |
| 3,257,039 | 6/1966 | Trutza | 222—181 X |

FOREIGN PATENTS 927,866    6/1963    Great Britain.

SAMUEL F. COLEMAN, *Primary Examiner.*

RAPHAEL M. LUPO, *Assistant Examiner.*

UNITED STATES PATENT OFFICE
CERTIFICATE OF CORRECTION

Patent No. 3,361,309                      January 2, 1968

Daniel Simkins

It is hereby certified that error appears in the above numbered patent requiring correction and that the said Letters Patent should read as corrected below.

Column 6, line 36, for "in claim" read -- in claim 1 --; line 74, for "from" read -- to --; same line 74, for "to" read -- from --.

Signed and sealed this 6th day of May 1969.

(SEAL)
Attest:

Edward M. Fletcher, Jr.
Attesting Officer

Commissioner of Patents